E. R. WINSLOW.
EGG TRAY.
APPLICATION FILED DEC. 28, 1912.
1,088,504.
Patented Feb. 24, 1914.
3 SHEETS—SHEET 1.
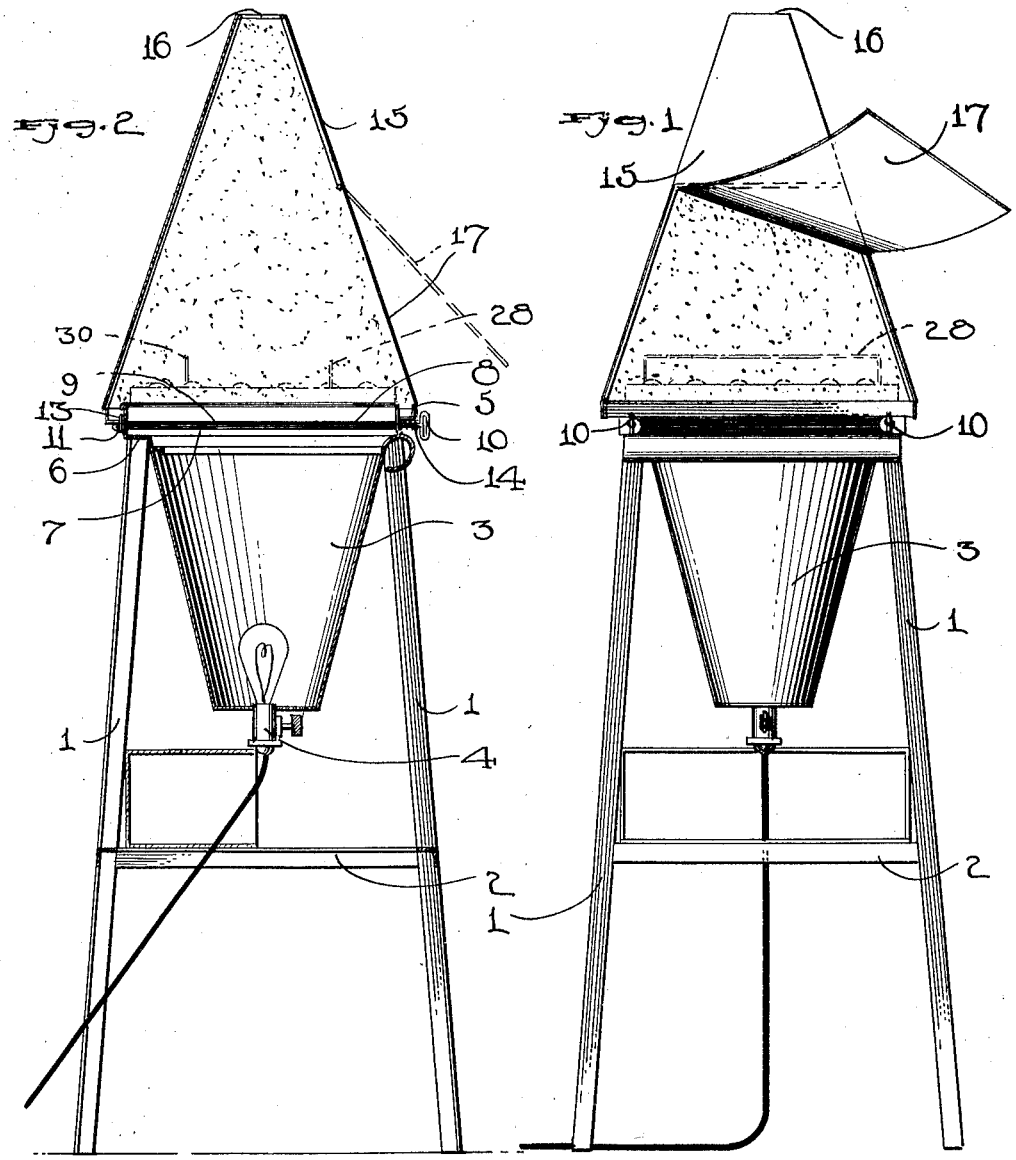
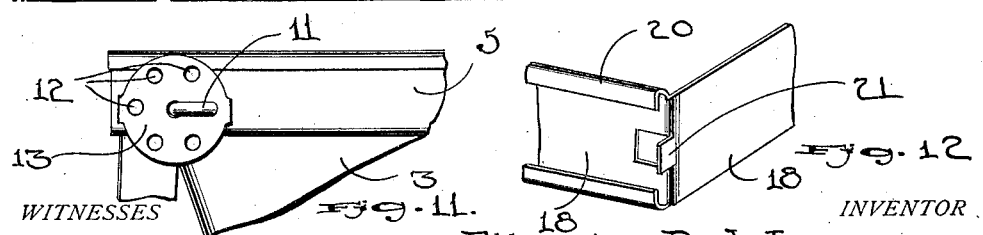
WITNESSES
INVENTOR
Elbert R. Winslow
his Attorney.

E. R. WINSLOW.
EGG TRAY.
APPLICATION FILED DEC. 28, 1912.
1,088,504.
Patented Feb. 24, 1914.
3 SHEETS—SHEET 2.
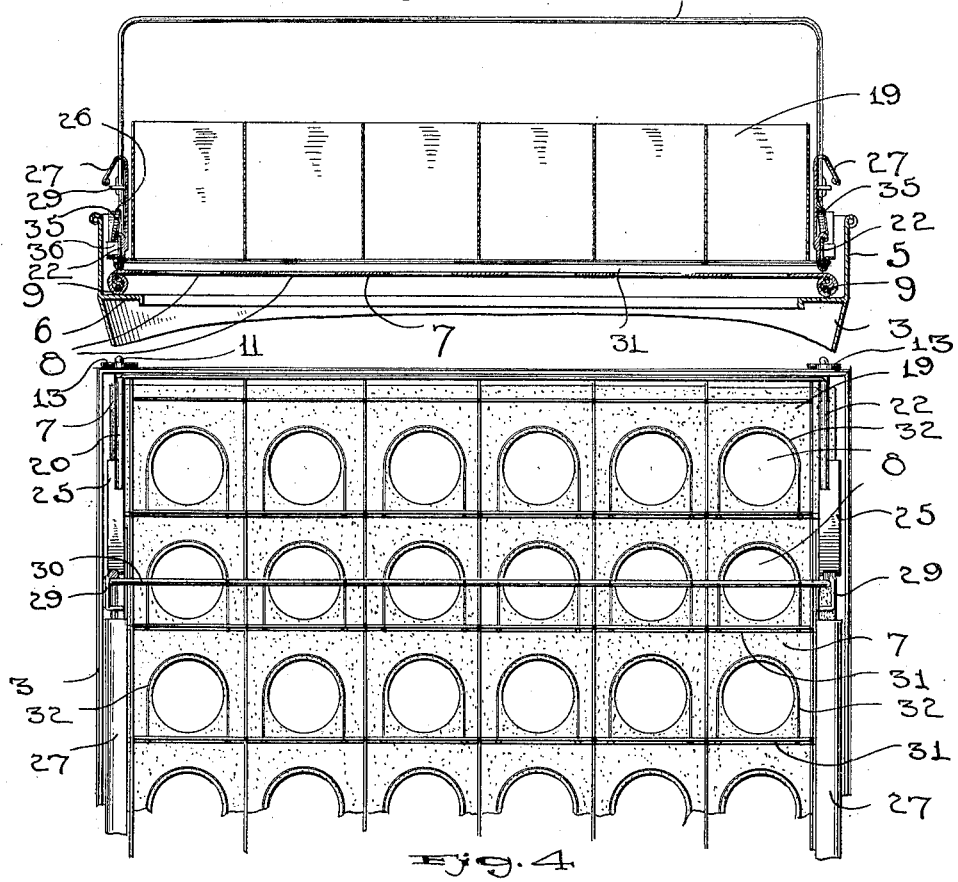
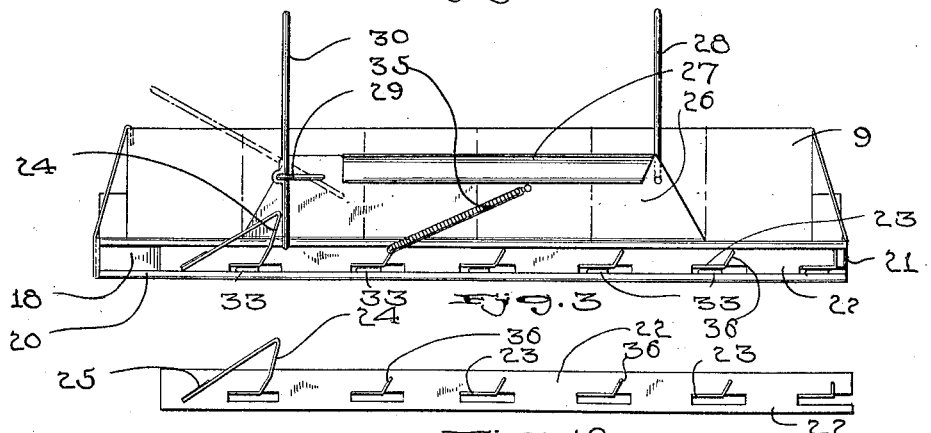
WITNESSES
INVENTOR
Elbert R. Winslow
his Attorney

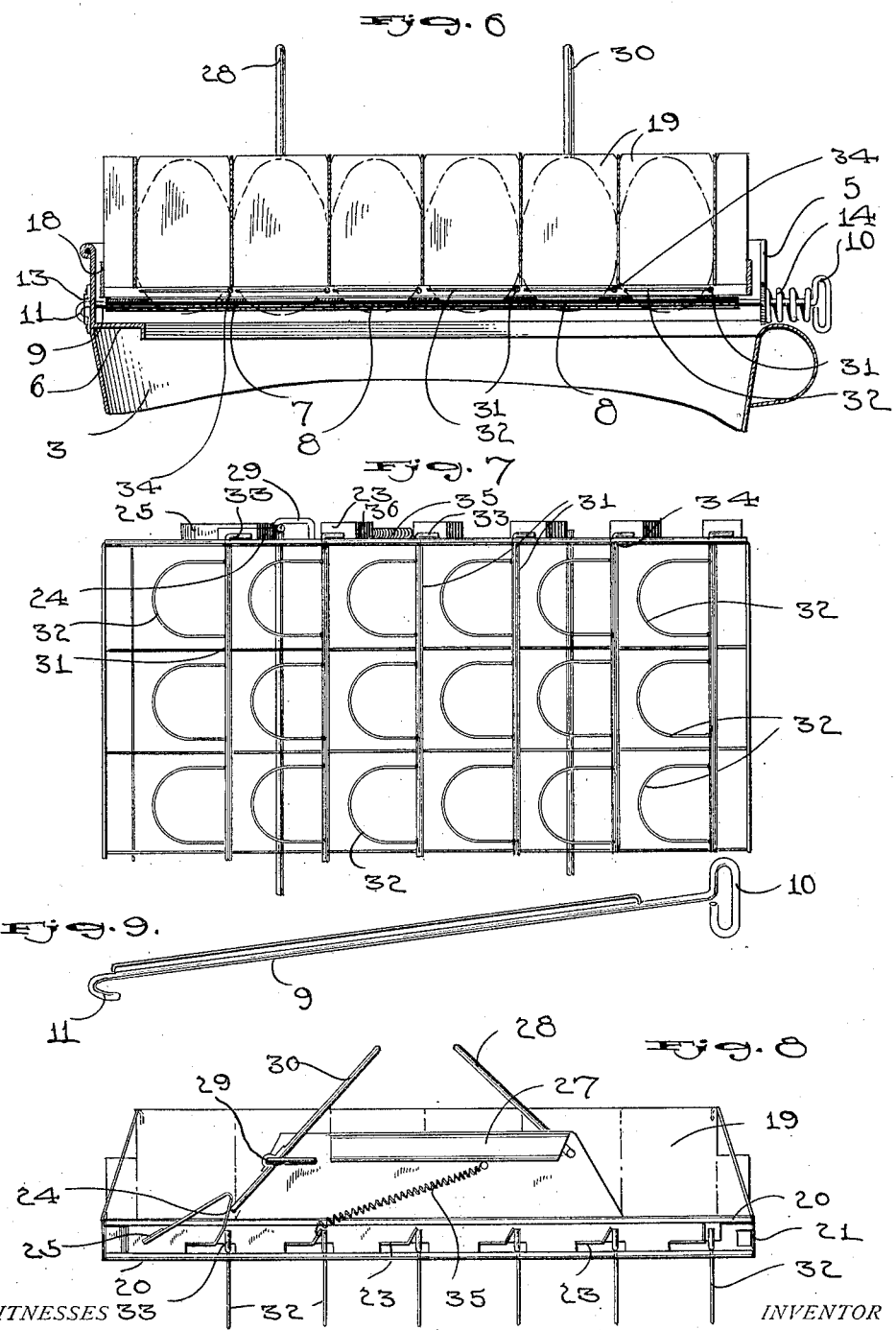

UNITED STATES PATENT OFFICE.

ELBERT R. WINSLOW, OF KEARNEY, NEBRASKA.

EGG-TRAY.

1,088,504.  Specification of Letters Patent.  Patented Feb. 24, 1914.

Application filed December 28, 1912. Serial No. 739,092.

*To all whom it may concern:*

Be it known that I, ELBERT R. WINSLOW, a citizen of the United States, residing at Kearney, in the county of Buffalo and State of Nebraska, have invented certain new and useful Improvements in Egg-Trays, of which the following is a specification, reference being had therein to the accompanying drawing.

This invention relates to egg trays and has for its object the production of a simple and efficient means for releasing the eggs from the tray.

Other objects and advantages of the invention will appear through the following specification and claims.

In the accompanying drawings:— Figure 1 is a side elevation of the improved tester. Fig. 2 is a central vertical section of the same. Fig. 3 is a side elevation of the egg tray. Fig. 4 is a fragmentary top plan view of the egg tray in position upon the light reflector hood. Fig. 5 is a transverse section of the egg tray in position upon the light reflector hood showing said hood partly broken away. Fig. 6 is a longitudinal section of the egg tray in position upon the light reflector hood showing the hood partly broken away. Fig. 7 is a fragmentary top plan view of the egg tray showing the same in the closed position. Fig. 8 is a side elevation of the egg tray showing the closing member in an open position. Fig. 9 is a perspective view of the tension rod. Fig. 10 is a side elevation of the slide frame used in connection with the egg tray. Fig. 11 is a plan view of the locking plate showing the reflector hood partly broken away. Fig. 12 is a fragmentary perspective view of one portion of the frame used in combination with the egg tray.

Referring to the accompanying drawings by numerals it will be seen that the device consists of a plurality of legs 1 which are provided with the braces 2. These legs carry upon their upper ends a light reflector hood 3 which is formed from a conical metallic member and is adapted to carry a light 4 in the bottom portion. The light reflector hood 3 is provided upon its upper side with a plurality of vertically extending walls 5 and with a laterally extending flange 6. Positioned above this flange 6 is a light screening curtain 7 which is provided with a plurality of apertures or openings 8. This curtain is mounted at each end portion upon the tension rod 9 which is provided with the handle 10, and by means of the rod 9 is held in a taut position. The end of the rod 9 is bent to form a hook 11 which is adapted to fit into one of the apertures 12 formed in the locking plate 13 which is carried by one of the walls 5. In order to hold the hook 11 in engagement with the locking plate 13 there is provided a coil spring 14 which is mounted upon the rod 9 adjacent the handle 10 and it bears upon the handle 10 and one of the vertical walls 5.

A light shielding hood 15 is used in combination with the light reflector hood and comprises a plurality of converging sides which terminate at a distance before meeting so as to allow the sight opening 16 whereby the eggs which are being tested may be viewed. One of the sides is provided with a flap 17 whereby the egg tray which is carried by the light reflector hood may be removed without lifting the shielding hood from its position upon the upper portion of the light reflector hood. By means of this hood which is mounted upon the upper portion of the light reflector hood a clear view of the eggs may be obtained when the same are being tested and will at the same time prevent any light other than the one used in the light shielding hood from being seen. The egg tray which is used in combination with this device consists of a frame 18 which is adapted to form a reinforcing means for the pocket members 19. The frame 18 extends entirely around the outer portion of the pocket member 19 and is provided with the track portion 20 upon its edge portion. At the corner portion of the frame 18 there is provided a lip 21 which is struck from one portion of the frame 18 and which is used as the stop for the sliding frame used in connection with the frame 18. This sliding frame comprises an elongated body 22 and which is adapted to slide within the track portion 20 formed upon the frame 18. The elongated body 22 is provided with a plurality of locking flanges 23 which are struck from the sliding frame 22 and bent at right angles thereto, one portion of the locking flanges 23 being bent in an upward direction relative to the other portion thereof. Formed adjacent to one of the locking flanges 23 there is provided a cam 24 which is supported upon the sliding frame 22 at 25. The frame 18 carries a vertically extending frame 26 which is provided upon its upper edge with the rolled portion 27. Near the top of this vertical frame 26 there is provided a lifting handle 28 whereby the tray may be lifted from the top portion of the light reflector hood. At the opposite end of the vertical frame 26 there is provided a yoke 29 upon which the operating handle 30 is pivotally mounted, the lower end of the handle 30 extending so as to engage the cam 24.

In order to hold the eggs within the pocket portions 19 there are provided a plurality of transversely extending rods 31 which carry the loop closing members 32 which are adapted to hold the eggs in their pocket portions. The end of each rod 31 is provided with a laterally extending finger 33 which passes in an aperture 34 formed in the frame 18 and rests under the locking flange 23 whereby the loop closing members 32 are normally held upon a horizontal plane since the laterally extending arms 33 rest under the end portion of the flanges 23. The sliding frame is normally held in a closed position by means of the coil spring 35 which is attached at one end to the vertical frame 26 and at the other end to one of the upwardly extending portions 36 of the locking flange 23. Since the locking flange 23 is struck from the body portion of the sliding frame 22 there is provided a plurality of longitudinally extending slots whereby the frame is moved to and fro without interference from the laterally extending arms 33. In order to limit the longitudinal movement of the sliding frame 22 the lip 21 is formed and since the end portion of the sliding frame will strike against the lip any danger of the sliding frame sliding too far is prevented.

The egg tray is provided upon each end with the frame 18, vertically extending frame 26 and sliding frame 22 whereby the strain of operation will be carried by both end portions.

In operation the tray is filled with eggs which are placed within the pocket portion 19 after which the same is placed in position upon the flange 6 carried by the light reflector hood. The hood 15 is then placed upon the upper portion of the reflector hood at which time the light carried by the bottom of the light reflector hood 3 is turned on. As the pocket portions 19 will register with the apertures 8 formed in the light distributing curtain 7 the light will be evenly distributed upon each egg and after the eggs have been tested the tray may be easily removed by lifting the flap 17 of the shielding hood 15 and removing the tray from engagement with the light reflector hood. The operating handle 30 may then be moved to one side whereby the lower end will bear upon the cam portion 24 and will in this manner move the sliding frame within the track portion 20. Since the rods 31 are pivotally mounted within the frame 18 the closing members 32 will open as illustrated in Fig. 8 as the laterally extending arms 33 will move out from under the locking flange 23 and will in this manner allow the eggs to be removed. As soon as the operating handle is released the spring 35 will move the sliding frame within the track portion and will in this manner force the laterally extending arm under the locking flange, whereby the members 32 will be closed.

The operating handle 30 is held in a position whereby the same may be easily grasped, when it is desired to move the sliding frame as illustrated in Fig. 4 in dotted lines since the lower portion of the handle 30 bears against a portion of the yoke 29.

Having thus described the invention what is claimed as new, is:—

1. An egg tray comprising a plurality of egg receiving pockets, a frame member positioned upon the outer side of said egg receiving pockets, said frame provided with a plurality of track portions, a sliding frame positioned within said track portions, egg retaining means carried by said frame and adapted to hold the eggs in said pockets, and said sliding frame adapted to co-act with said egg retaining means for allowing said eggs to be removed when so desired.

2. An egg tray comprising a plurality of egg receiving pockets, a frame positioned upon the outer side of said pockets, said frame provided with a plurality of track portions, sliding frames carried by said track portions and adapted to move to and fro therein, transversely extending rods carried by said frame, said transversely extending rods provided with a plurality of retaining loops which are adapted to hold the eggs in said pockets, said rods provided with laterally extending arms at each end thereof, said laterally extending arms and said sliding frame adapted to co-act for allowing the eggs to be removed from said tray when so desired.

3. An egg tray comprising a plurality of egg receiving pockets, a frame positioned upon the outer side of said pockets, said frame provided with a plurality of track portions, a sliding frame positioned within said track portions, transversely extending rods carried by said frame and provided with egg retaining means, said rods provided with laterally extending arms, said sliding frame provided with a plurality of longitudinally extending slots, said arms passing through said slots, said sliding frame provided with a plurality of cam members adjacent said slot, and means for moving said sliding frame to and fro for allowing the eggs to be removed from said tray when so desired.

4. An egg tray comprising a plurality of pockets, a frame positioned upon the outer side of said pockets, said frame provided with a plurality of track portions, a sliding frame positioned within said track portions, transversely extending rods carried by said frame, means carried by said rods for holding the eggs in said pockets, said rods provided with laterally extending arms, said sliding frame provided with a plurality of locking flanges struck from the body portion thereof and bent at right angles thereto, said laterally extending arms adapted to fit under said flanges for normally holding the egg retaining means in a closed position, one portion of said flanges bent upwardly so as to allow the egg retaining means to open to allow said eggs to be removed from said tray, and means for normally holding said laterally extending arms under said flanges for holding said egg retaining means in a closed position.

5. An egg tray comprising a plurality of pockets, a frame positioned upon the outer side of said pockets, said frame provided with a plurality of track portions, a sliding frame positioned within said track portions, transversely extending rods carried by said frame and provided with egg retaining means, said rods provided with laterally extending arms upon their end portions, said sliding frame provided with laterally extending locking flanges, a longitudinally extending slot formed in said sliding frame whereby said frame may move to and fro without interference from said transversely extending arms, said laterally extending arms normally fitting under said locking flanges, one portion of said flanges bent upwardly so as to allow said egg retaining means to open when so desired, means for normally holding said egg retaining means in a closed position, a vertical extending frame carried by said first mentioned frame, said vertically extending frame provided with a yoke member, an operating handle pivotally mounted upon said yoke, a cam member carried by said sliding frame, the lower end of said operating handle adapted to bear upon said cam member whereby said sliding frame may be moved in one direction so as to allow said laterally extending arms to move out from under the locking flanges whereby the egg retaining means may be opened so as to allow the eggs to be removed from said tray.

6. An egg tray comprising a plurality of pockets, a frame positioned upon the outer side of said pockets, said frame provided with a plurality of track portions, a sliding frame positioned within said track portions, transversely extending rods carried by said frame and provided with egg retaining means, said rods provided with laterally extending arms upon their end portions, said sliding frame provided with laterally extending locking flanges, a longitudinally extending slot formed in said sliding frame whereby said frame may move to and fro without interference from said transversely extending arms, said laterally extending arms normally fitting under said locking flanges, one portion of said flanges bent upwardly so as to allow said egg retaining means to open when so desired, means for normally holding said egg retaining means in a closed position, a vertically extending frame carried by said first mentioned frame, said vertically extending frame provided with a yoke member, an operating handle pivotally mounted upon said yoke, a cam member carried by said sliding frame, the lower end of said operating handle adapted to bear upon said cam member whereby said sliding frame may be moved in one direction so as to allow said laterally extending arms to move out from under the locking flanges whereby the egg retaining means may be opened so as to allow the eggs to be removed from said tray, and said frame provided with lips struck from the body portion and engaging the corners thereof and at the end of the track portions for limiting the sliding movement of the sliding frame in one direction.

7. An egg tray comprising a plurality of pockets, a frame positioned upon the outer side of said pockets, said frame provided with a plurality of track portions, a sliding frame positioned within said track portions, transversely extending rods carried by said frame and provided with egg retaining means, said rods provided with laterally extending arms upon their end portions, said sliding frame provided with laterally extending locking flanges, a longitudinally extending slot formed in said sliding frame whereby said frame may move to and fro without interference from said transversely extending arms, said laterally extending arms normally fitting under said locking flanges, one portion of said flanges bent upwardly so as to allow said egg retaining means to open when so desired, means for normally holding said egg retaining means in a closed position, a vertically extending frame carried by said first mentioned frame, said vertically extending frame provided with a yoke member, an operating handle pivotally mounted upon said yoke, a cam member carried by said sliding frame, the lower end of said operating handle adapted to bear upon said cam member whereby said sliding frame may be moved in one direction so as to allow said laterally extending arms to move out from under the locking flanges whereby the egg retaining means may be opened so as to allow the eggs to be removed from said tray, said yoke adapted to form a bearing means for said operating handle when the same is swung in one direction whereby said handle will always be held in a position whereby the same may be easily grasped when it is desired to move said sliding frame since the lower portion of said handle will bear upon one side of said yoke.

In testimony whereof I hereunto affix my signature in presence of two witnesses.

ELBERT R. WINSLOW.

Witnesses:
JAMES W. WILSON,
M. A. NYE.